United States Patent
Kandekar et al.

(10) Patent No.: US 8,301,797 B1
(45) Date of Patent: *Oct. 30, 2012

(54) METHOD AND SYSTEM FOR PROVIDING DATA STREAMS IN A VIRTUAL ENVIRONMENT

(75) Inventors: Kunal Kandekar, Jersey City, NJ (US); Richard J. Walsh, Raleigh, NC (US)

(73) Assignee: Qurio Holdings Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/285,329

(22) Filed: Oct. 31, 2011

Related U.S. Application Data

(63) Continuation of application No. 12/477,987, filed on Jun. 4, 2009, now Pat. No. 8,051,195.

(51) Int. Cl.
 *G06F 15/16* (2006.01)
 *G06F 15/173* (2006.01)
 *G06F 17/00* (2006.01)

(52) U.S. Cl. .......................... 709/231; 709/226; 463/42

(58) Field of Classification Search .................. None
 See application file for complete search history.

(56) References Cited

U.S. PATENT DOCUMENTS

| | | | |
|---|---|---|---|
| 6,329,986 B1 | 12/2001 | Cheng | |
| 6,746,332 B1 * | 6/2004 | Ing et al. ..................... | 463/42 |
| 6,912,565 B1 | 6/2005 | Powers et al. | |
| 7,388,585 B2 | 6/2008 | Kristiansen | |
| 7,831,707 B2 | 11/2010 | Bardsley | |
| 7,843,876 B2 * | 11/2010 | Holt et al. ..................... | 370/329 |
| 2005/0026692 A1 | 2/2005 | Dyl | |
| 2005/0171997 A1 * | 8/2005 | Seo et al. ..................... | 709/202 |
| 2007/0021110 A1 | 1/2007 | Chaudhri et al. | |
| 2007/0288598 A1 | 12/2007 | Edeker et al. | |
| 2009/0172157 A1 | 7/2009 | Zhang | |
| 2009/0319681 A1 | 12/2009 | Freelander et al. | |
| 2010/0156899 A1 | 6/2010 | Bolger et al. | |
| 2010/0306652 A1 | 12/2010 | Bolger et al. | |
| 2010/0318662 A1 * | 12/2010 | Wie et al. ..................... | 709/226 |

FOREIGN PATENT DOCUMENTS

| | | |
|---|---|---|
| WO | 03081447 A1 | 10/2003 |
| WO | 2007124590 A1 | 11/2007 |

OTHER PUBLICATIONS

Allman, M., et al., "TCP Congestion Control," (article), Apr. 1999, 15 pages, Request for Comments (RFC) 2581, Internet Engineering Task Force, http://rfc.sunsite.dk/rfc/rfc2581.html.

(Continued)

*Primary Examiner* — Wen-Tai Lin
(74) *Attorney, Agent, or Firm* — Withrow & Terranova, PLLC

(57) ABSTRACT

A method and system for providing content in a virtual environment. A host computer hosting a region in a virtual environment provides an event stream including a plurality of event data segments identifying activity occurring in the virtual environment to a client computer participating in the virtual environment. The host computer receives a request to provide virtual environment content including imagery data associated with the virtual environment to the client computer, and provides a content stream including a plurality of content data segments containing virtual environment content at a content stream bandwidth based on an event stream bandwidth associated with the event stream to the client computer.

17 Claims, 12 Drawing Sheets

OTHER PUBLICATIONS

Arcila, Thomas, et al., "FlowVR: A Framework for Distributed Virtual Reality Applications," (article), Nov. 13-14, 2006, 6 pages, Journees de l'AFRV, Rocquencourt, https://pedagogie.ec-nantes.fr/afrv/uploads/File/11.pdf.

Bernardini, R., et al., "Accessing Multi-user Virtual Worlds over IP," (article), Nov. 21-23, 2001, pp. 407-413, Proc. on Vision Modeling and Visualization 2001, Stuttgart, Germany, http://www.vis.uni-stuttgart.de/vmv01/dl/posters/17.pdf.

Borland, John, "A Virtual World with Peer-to-Peer Style," (article), May 9, 2005, 3 pages, CNET News.com, http://news_cnet.com/A-virtual-world-with-peer-to-peer-style/2100-1025_3-5698499.html.

Boulanger, Jean-Sébastien, "Comparing Interest Management Algorithms for Massively Multiplayer Games," Master's Thesis, McGill University, 2006.

Crippa, M., et al., "Peer-to-peer support for instance-based massively multiplayer games," (article), Nov. 7-9, 2007, 4 pages, Sixth Brazilian Symposium on Computer Games and Digital Entertainment (SBGames 2007), http://www.inf.unisinos.br/~sbgames/anais/shortpapers/34739.pdf.

Hawkes, Rycharde, et al., "Distributed Virtual Environments and VRML: an Event-based Architecture," (PowerPoint Presentation), Apr. 14-18, 1998, 15 pages, Proceedings of the Seventh International World Wide Web Conference (WWW7), Brisbane, Australia, www.hpl.hp.com/personal/rych/publications/www7/www7.pps.

Hosseini, Mojtaba, et al., "Visibility-based Interest Management in Collaborative Virtual Environments," (article), Sep. 30-Oct. 2, 2002, pp. 143-144, Proceedings of the 4th International Conference on Collaborative Virtual Environments, Bonn, Germany.

Hu, Shun-Yun, "A Case for 3D Streaming on Peer-to-Peer Networks," (article), Apr. 18-21, 2006, pp. 57-63, Proceedings of the Eleventh International Conference on 3D Web Technology, Columbia, Maryland, http://www.web3d.org/x3d/learn/web3d_2006/057-hu.pdf.

Hu, Shun-Yun, et al., "A Case for Peer-to-Peer 3D Streaming," (article), 2006, 8 pages, ASCEND Technical Report (ASCEND-TR-002-2006A), http://ascend.sourceforge.net/docs/pub/ASCEND-TR-002-2006A.pdf.

Hu, Shun-Yun, et al., "Scalable Peer-to-Peer Networked Virtual Environment," Aug. 2004, pp. 129-133, in Proc. 3rd ACM SIGCOMM 2004 workshops on NetGames.

Iimura, Takuji, et al., "Zoned Federation of Game Servers: a Peer-to-peer Approach to Scalable Multi-player Online Games," Aug. 2004, pp. 116-120, Proceedings of the 3rd ACM SIGCOMM 2004 Workshops on NetGames.

Keum, Seung-Woo, et al., "Real-Image-Based Distributed Virtual Reality System with Java3D," (article), Dec. 5-7, 2001, pp. 191-194, vol. 11, International Conference on Artificial Reality and Telexistence (ICAT 2001), Tokyo, Japan, http://www.vrsj.org/ic-at/papers101191.pdf.

Knutsson, Björn, et al., "Peer-to-Peer Support for Massively Multiplayer Games," Mar. 2004, 12 pages, 23rd Conference of the IEEE Communications Society (INFOCOM '04), Hong Kong, China.

No Author, "Daffie Event Manager Reference," (article), Sep. 16, 2008, 3 pages, Scientific Computing & Visualization, Boston University, http://scv.bu.edu/visualization/daffie/event-manager.html.

No Author, "Multiverse Technology: An Overview," (article), 2005, 12 pages, http://www.multiverse.net/platform/whitepapers/mv_overview.pdf.

No Author, "Main Page—Solipsis," (website), Solipsis, obtained Feb. 6, 2007, 2 pages, http://solipsis.netofpeers.net/wiki2/index.php/Main_Page.

No Author, "www.uni-verse.org—Uni-verse Home," (website), Uni-Verse, obtained Mar. 19, 2007, 4 pages, http://www.uni-verse.org/Uni-verse-Home.72.0.html.

Smed, Jouni, et al., "A Review on Networking and Multiplayer Computer Games," Apr. 2002, 30 pages, Technical Report No. 454, Turku Centre for Computer Science.

Vellon, Manny, et al., "The Architecture of a Distributed Virtual Worlds System," (Technical Report), 1998, 8 pages, Microsoft Corporation, Virtual Worlds Research Group, http://research.microsoft.com/en-us/um/people/sdrucker/papers/oousenix.pdf.

Non-Final Rejection mailed Mar. 23, 2011, for U.S. Appl. No. 12/477,987, 16 pages.

Notice of Allowance mailed Sep. 1, 2011, for U.S. Appl. No. 12/477,987, 10 pages.

\* cited by examiner

METHOD AND SYSTEM FOR PROVIDING DATA STREAMS IN A VIRTUAL ENVIRONMENT

RELATED APPLICATIONS

This application is a Continuation of co-pending U.S. patent application Ser. No. 12/477,987, entitled "Method and System for Providing Data Streams in a Virtual Environment," which was filed on Jun. 4, 2009, now U.S. Pat. No. 8,051,195, and is hereby incorporated herein by reference in its entirety.

FIELD OF THE INVENTION

The present invention relates generally to data streams in a virtual environment, and in particular to adjusting a content data stream based on a bandwidth associated with an event data stream.

BACKGROUND OF THE INVENTION

Immersive computer-based virtual environments are popular today and are used in a wide variety of applications, including in training and gaming applications. A virtual environment usually features a computer-generated two- or three-dimensional landscape that represents an actual or imaginary location in a past, present, or future time. A user is represented in a virtual environment via a graphical representation that is commonly referred to as an avatar. The user can manipulate the avatar in the virtual environment via a client application that executes on a processing device, such as a computer. The user can direct the avatars to roam the landscape and interact with other users' avatars and with other computer-controlled objects. Avatars and other entities in the virtual environment are referred to as virtual objects.

There are several different architectures that may be used to implement a virtual environment. One type of virtual environment is owned and controlled by a single entity, such as a company, which provides host computers that implement the virtual environment. The company also provides a proprietary client application to users who wish to participate in the virtual environment. The proprietary client application typically runs on hardware provided by the respective user. Each host computer in the virtual environment controls and manages a respective region in the virtual environment. A client application connects to a particular host computer over a network when the user begins to participate in the virtual environment. The client application provides data to the host computer that describes the movements of the avatar that is being manipulated by the user. The client application also renders the virtual environment on a display device for the user. The host computer provides an event stream of event data to the client applications describing activities and state changes of virtual objects that occur within a volume about the respective avatar, sometimes referred to as an area of interest. The client applications use the event stream to continually update the display device for the user so the user is aware of changes occurring within the area of interest of the avatar. The content virtual objects that make up the scenery of the landscape of the virtual environment and that are rendered for the user are typically provided to the client applications during an installation process prior to the user's participation in the virtual environment.

The bandwidth required by the event stream differs depending on the level of activity occurring within the area of interest of the avatar. An event stream may require significant bandwidth to identify all the activity occurring during a battle between two large groups of virtual objects, for example, but may require minimal bandwidth to identify the activity occurring in the virtual environment if the avatar is alone in a forest. If the bandwidth required by the event stream exceeds the bandwidth of a communications path between the client application and the host computer sending the event stream, event data latency may increase to a point that lag results. Lag manifests itself as jerky or non-uniform movement of virtual objects in the virtual environment and is undesirable to a user of the virtual environment.

Another type of virtual environment architecture is a distributed virtual environment, where each separate region of the distributed virtual environment may be provided by a host computer that is owned and operated by a separate entity. In a distributed virtual environment, each host computer manages and controls a respective region of the distributed virtual environment. The owner of the host computer may change the landscape of the region arbitrarily, and may connect to or disconnect from the distributed virtual environment unpredictably. Consequently, it may be impractical or impossible to provide content virtual objects that make up the scenery associated with the landscape of the various regions to the client applications in advance of participation by the user in the distributed virtual environment. Instead, such content virtual objects are typically provided to the client applications in a content stream during participation in the distributed virtual environment. Because scenery may be graphics intensive, the content stream may require significant bandwidth. Therefore, the content stream may compete with the event stream for bandwidth of the communications path between the respective client application and the host computer, increasing event data latency and resulting in lag. Thus, there is a need for mechanisms to coordinate a content stream in view of an event stream to reduce or prevent lag in a distributed virtual environment.

SUMMARY OF THE INVENTION

The present invention includes methods and systems for providing a content stream of content data in proportion to an event stream of event data such that lag associated with event data latency is eliminated or minimized. A host computer hosting a region of a virtual environment connects to a client computer. The host computer provides an event stream of event data segments identifying activity occurring in the virtual environment to the client computer. The host computer receives a request to provide virtual environment content including imagery data associated with the virtual environment to the client computer. The host computer provides the client computer a content stream including a plurality of content data segments containing virtual environment content at a content stream bandwidth that is proportional to an event stream bandwidth associated with the event stream. The host computer can receive feedback from the client computer to alter the content stream bandwidth. The feedback may request that the content stream bandwidth be increased or decreased, for example. The host computer can alter the content stream bandwidth based on the feedback.

In one embodiment, the event stream and the content stream are multiplexed into a message stream, wherein the message stream includes messages that include at least one content data segment and at least one event data segment. A size or quantity of content data segments may be determined that results in a desired proportion of content stream bandwidth to event stream bandwidth. The client computer includes a message handler that separates the event data segments from the message stream and forwards the event data segments to an event handler for subsequent handling. The message handler also separates the content data segments from the message stream and forwards the content data segments to a content handler for subsequent handling.

In one embodiment, the event stream and the content stream share a single connection between the host computer and the client computer. In a Transmission Control Protocol/Internet Protocol (TCP/IP) environment, for example, the event stream and the content stream are written to the same socket on the host computer and read from the same socket on the client computer. The use of a single connection can reduce processor utilization associated with otherwise managing data coming from different connections.

In one embodiment, a first host computer associated with a first region of the virtual environment receives event data or content data from a second host computer associated with a second region of the virtual environment. The first host computer provides a message stream to the client computer that includes content data and event data associated with both the first and second regions of the virtual environment.

In another embodiment, the client computer has separate connections with each of a plurality of host computers. The client computer calculates a desired bandwidth associated with an event stream originating from one of the plurality of host computers. The client computer determines a bandwidth utilization associated with content streams coming from each of the plurality of host computers. Based on a bandwidth associated with a communications path of the client computer and the desired bandwidth of the event stream, the client computer provides feedback to each of the plurality of host computers to alter the content stream bandwidth of the content stream originating from the respective host computer to ensure that the event stream has sufficient bandwidth to eliminate, or minimize, lag associated with event data latency.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention includes methods and systems for providing a content stream of content data in proportion to an event stream of event data such that lag associated with event data latency is eliminated or minimized. A host computer hosting a region of a virtual environment connects to a client computer. The host computer provides an event stream of event data segments identifying activity occurring in the virtual environment to the client computer. The host computer provides the client computer virtual environment content including imagery data associated with the virtual environment. The host computer provides the client computer a content stream including a plurality of content data segments containing virtual environment content at a content stream bandwidth that is proportional to an event stream bandwidth associated with the event stream. The content may be provided in response to a request for virtual environment content from the client computer, or may be provided based on a determination by the host computer that virtual environment content should be provided to the client computer.

Figure 1:
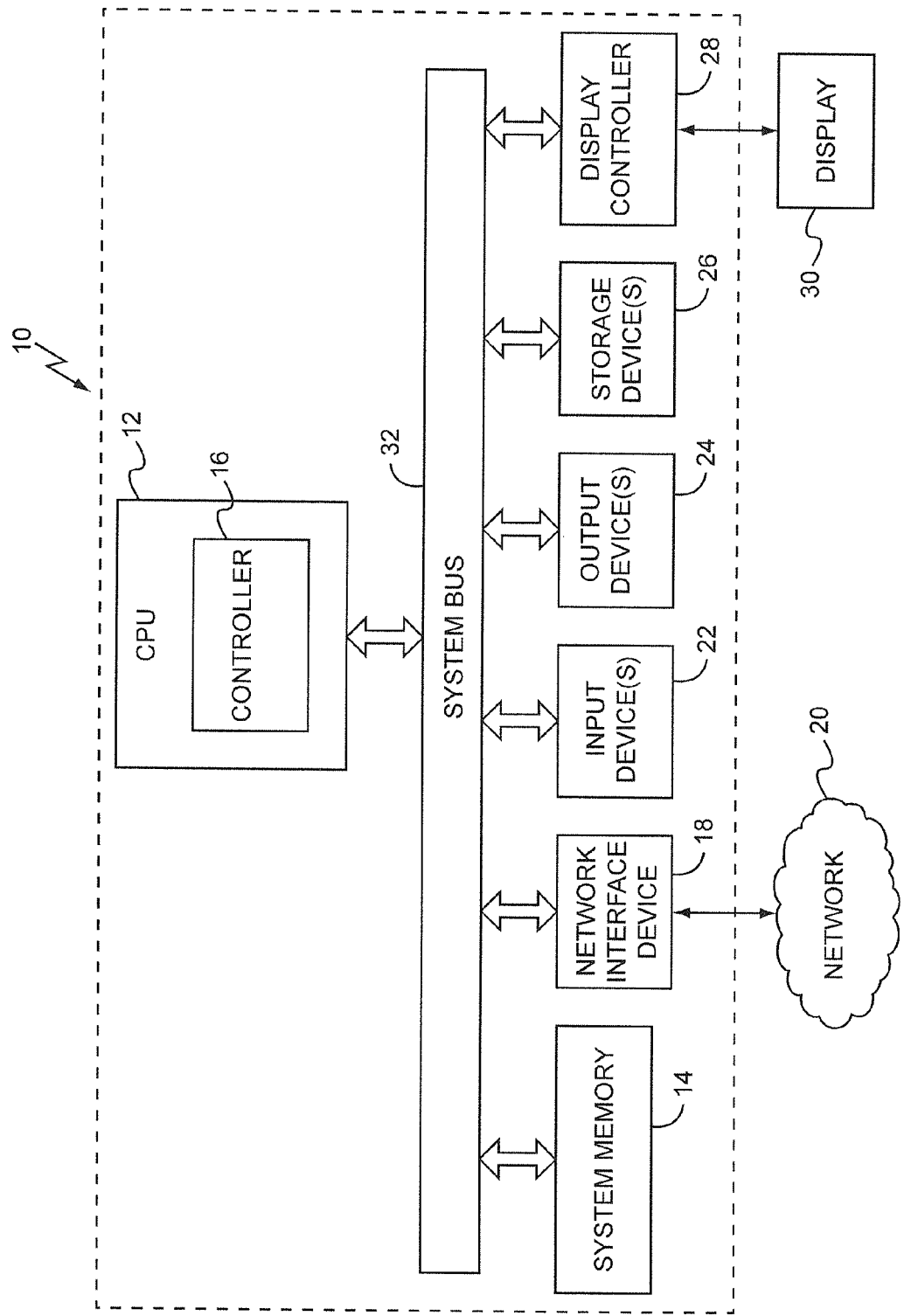
FIG. 1 is a block diagram illustrating an exemplary processing device.

FIG. 1 is a block diagram illustrating an exemplary processing device 10 suitable for use as a host computer or a client computer as described herein. The processing device 10 includes a central processing unit (CPU) 12 that may comprise any special-purpose or conventional CPU, such as a CPU provided by the Intel Corporation or Advanced Micro Devices, Inc. The CPU 12 includes conventional CPU features such as registers, cache memories, and the like, which enable the CPU 12 to execute software contained in a system memory 14 to provide particular functionality as directed by the software. The ability to provide such functionality is represented by a controller 16, which in essence provides the functionality described herein with respect to host computers and client computers, based on the software instructions obtained from the system memory 14. The system memory 14 may be provided the software instructions from an external device, such as a compact disc (CD) or disk drive, for example. The processing device 10 includes a network interface device 18 for enabling the processing device 10 to talk with other processing devices 10 or other network aware devices, as desired, via a network 20. The processing device 10 also preferably includes one or more input devices 22, such as a mouse, a keyboard, a touch pad, and the like.

The processing device 10 may also include one or more output devices 24, such as a printer or the like. Data may be obtained via one or more storage devices 26, such as a CD reader, a digital video disc (DVD) reader, a hard drive, and the like. The processing device 10 may include a display controller 28 that can drive a display device 30 to enable information to be presented to a user. The display device 30 may be an external component, such as a liquid crystal display (LCD) computer monitor, or may be integrated with the processing device 10, such as a handheld gaming device that includes an integrated LCD screen. A system bus 32 provides a data path between the CPU 12 and the various other components, such as the system memory 14, the network interface device 18, the one or more input devices 22, the output devices 24, the storage devices 26, and the display controller 28. While for simplicity only a single system bus 32 is shown, it will be appreciated by those skilled in the art that the CPU 12 may communicate with different components of the processing device 10 via different data communication mechanisms. Processing devices 10 suitable for providing host and client functionality as described below include personal computers, servers, personal digital assistants, cellular phones, handheld or console gaming platforms, and the like.

Figure 2:
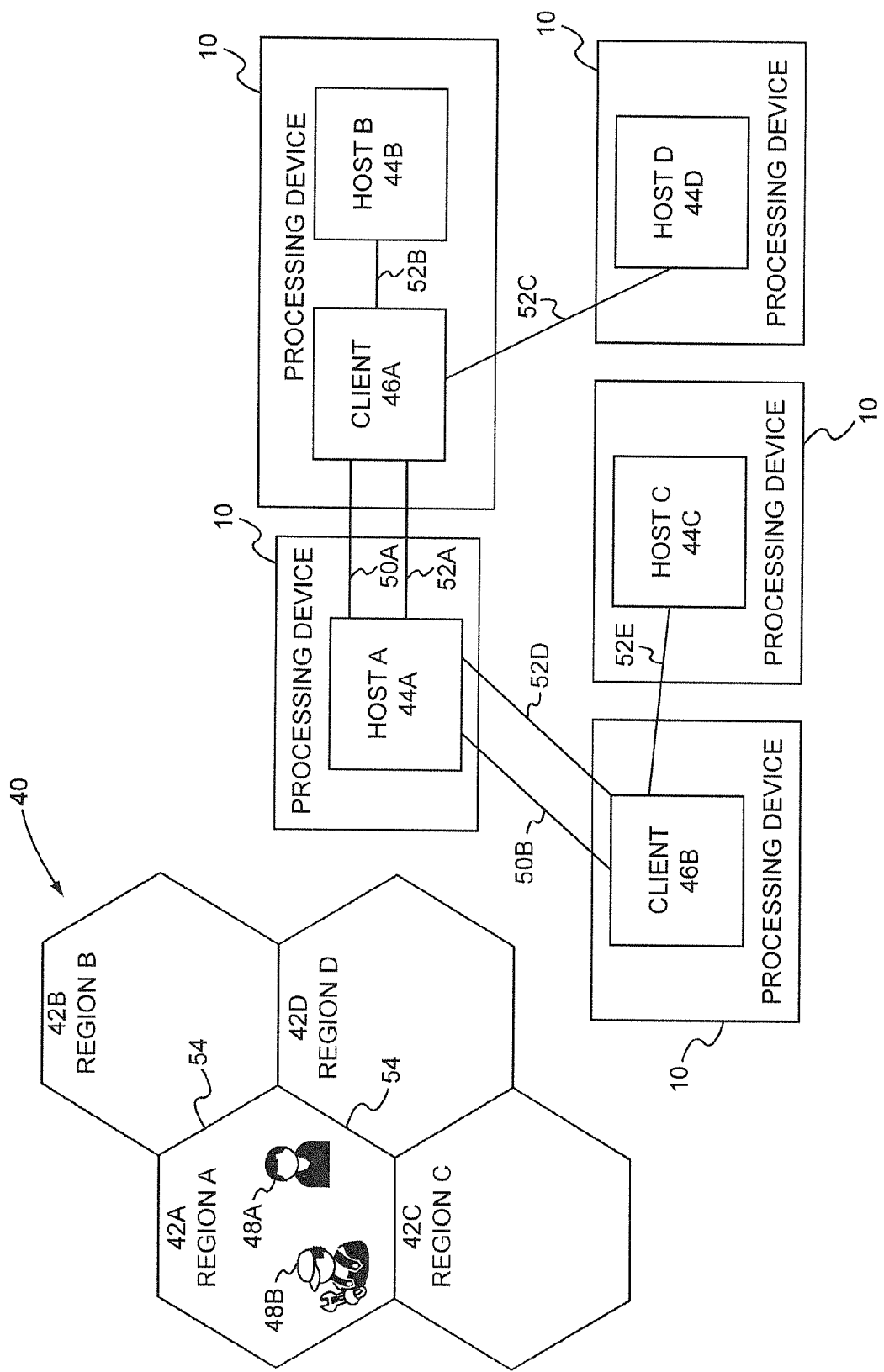
FIG. 2 is a block diagram illustrating an exemplary distributed virtual environment and logical connections between hosts and clients.

FIG. 2 is a block diagram illustrating an exemplary distributed virtual environment and logical connections between hosts and clients used therein. A distributed virtual environment 40 includes a plurality of regions 42A-42D. The regions 42A-42D may be referred to collectively as the regions 42 where the discussion may apply to more than one region 42, or singularly as the region 42. Each of the regions 42 represents a particular portion of the landscape, or scenery, of the distributed virtual environment 40. The distributed virtual environment 40 can comprise any desired landscape, or scenery, such as a medieval kingdom from the past, an urban environment in the present day, or a planetary system, for example. While shown for purposes of illustration as having a hexagonal shape, the regions 42 may have any desired shape. The regions 42 may appear contiguous to a user of the distributed virtual environment 40, and borders between regions 42, or even the fact that the distributed virtual environment 40 is divided into the regions 42, may be transparent to a user of the distributed virtual environment 40.

Each of the regions 42A-42D is controlled, or managed, by a respective host 44A-44D. The hosts 44 may be implemented on respective processing devices 10, as discussed with respect to FIG. 1. Users participate in the distributed virtual environment 40 via clients 46A, 46B. The clients 46 may also be implemented on a processing device 10. Assuming a processing device 10 has sufficient processing capability, multiple hosts 44 or clients 46 may be implemented on a single processing device 10, as illustrated in FIG. 2 wherein the host 44B and the client 46A are implemented on a single processing device 10, which may comprise, for example, a user's desktop computer. Each client 46A, 46B has an associated avatar 48A, 48B, respectively, which represents the user of the respective client 46 in the distributed virtual environment 40. The avatars 48A, 48B are virtual objects in the distributed virtual environment 40 and are manipulated by the users via the clients 46A, 46B. Each client 46 also renders a respective portion of the distributed virtual environment 40 for the respective user on a display device.

Typically, a client 46 is connected to a particular host 44 that controls the region 42 in which the avatar 48 associated with the respective client 46 is currently located. For example, since the avatar 48A in FIG. 2 is currently located in the region 42A, the client 46A is connected to the host 44A. Hosts 44 receive input from one or more clients 46 identifying movements and other activities of respective avatars 48. The hosts 44 in turn provide event data describing activity and state changes associated with avatars 48 and computer-controlled virtual objects, such as birds, dragons, and the like, to clients 46. The clients 46 receive this event data in an event stream and continually render the distributed virtual environment 40 for the user, altering the rendering based on the event data. For example, if the avatar 48B begins to move away from the avatar 48A, the client 46B provides an event stream 50B comprising event data identifying the activity associated with the movement of the avatar 48B to the host 44A. The host 44A, in turn, provides an event stream 50A comprising event data identifying the activity associated with the movement of the avatar 48B to the client 46A, which can then provide a rendering of the distributed virtual environment 40 to the user showing the avatar 48B moving away from the avatar 48A. Or, as another example, if a computer-controlled virtual object such as a dragon (not shown) begins moving toward the avatar 48A, the host 44A can provide event data identifying this activity via the event stream 50A to the client 46A, which can in turn render the distributed virtual environment 40 for the user, who may wish to manipulate the avatar 48A to avoid the dragon. The host 44A may simultaneously be providing event data via an event stream 50B to the client 46B showing the dragon moving toward the avatar 48A, then showing the avatar 48A moving away from the dragon. The client 46B can render this activity for a respective user associated with the client 46B.

Each host 44 may be controlled or owned by a separate entity, or company, and may be responsible for providing the landscape associated with the respective region 42. Each host 44 may connect or disconnect from the distributed virtual environment 40 arbitrarily, and the landscape of the respective region 42 may also be modified arbitrarily by the respective owner of the host 44. Consequently, users of the distributed virtual environment 40 may be unable to obtain the content associated with the distributed virtual environment 40 prior to participating in the distributed virtual environment 40. Instead, each host 44 may stream, or progressively provide, content to the clients 46 based on the current location of the respective avatar 48, and a direction, if any, of movement of the avatar 48. Mechanisms for streaming virtual environment content to a client 46 are known to those skilled in the art, and may include, but are not limited to, the use of technologies such as Hypertext Transfer Protocol (HTTP), File Transfer Protocol (FTP), Bittorrent, and the like, but will not otherwise be discussed in detail herein. According to one embodiment, such content may be provided on the basis of a prioritization scheme such as that disclosed in co-pending U.S. patent application Ser. No. 12/347,179 entitled PRIORITIZING VIRTUAL OBJECT DOWNLOADS IN A DISTRIBUTED VIRTUAL ENVIRONMENT, filed Dec. 31, 2008, the disclosure of which is hereby incorporated herein in its entirety.

For example, as the avatar 48A roams the region 42A, the host 44A may provide virtual environment content comprising imagery data associated with the region 42A via a content stream 52A to the client 46A. Imagery data can comprise graphical content associated with one or more virtual objects in the region 42A, such as video or graphical images, rendering data describing an appearance of one or more virtual objects, or audio content associated with sounds in the region 42A. The content stream 52A may include, for example, a plurality of content data segments containing the virtual environment content. As the avatar 48A approaches a border 54 that separates the region 42A from the region 42B, the client 46A may also begin to receive a content stream 52B from the host 44B comprising imagery data associated with the region 42B. Similarly, the client 46A may also receive a content stream 52C from the host 44D due to the proximity of the avatar 48A to the border 54 separating the region 42A from the region 42D. Thus, in one embodiment, the client 46 may simultaneously receive multiple data streams, such as the event stream 50A and the content streams 52A-52C, from several different hosts 44. Similarly, the client 46B may be receiving a content stream 52D from the host 44A and a content stream 52E from the host 44C.

Figure 3:
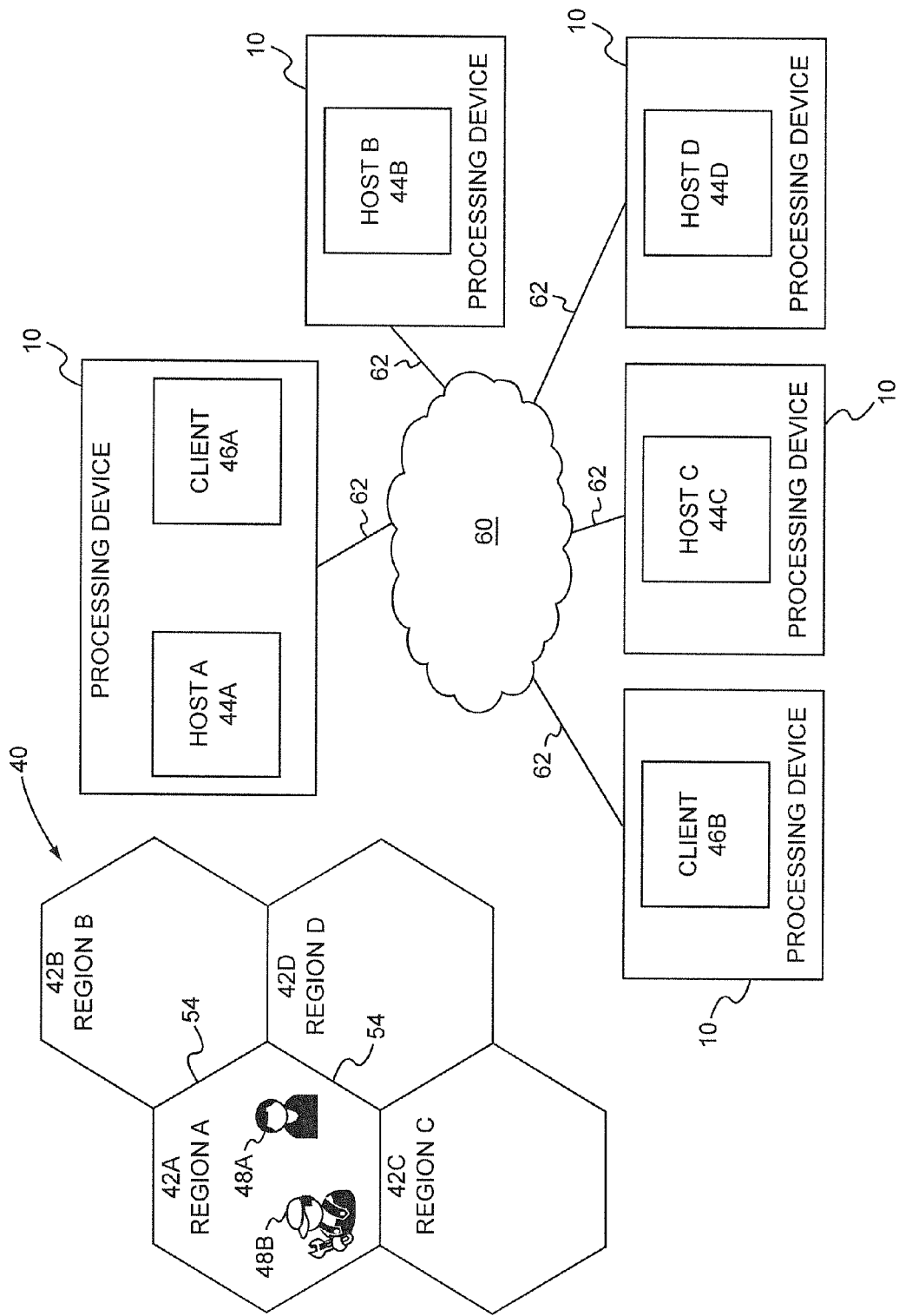
FIG. 3 is a block diagram illustrating the distributed virtual environment shown in FIG. 2 and communication links between hosts and clients.

FIG. 3 is a block diagram illustrating the distributed virtual environment 40 shown in FIG. 2 and data connections between hosts 44 and clients 46. The processing devices 10 are coupled together via a network 60 and communication links 62. The network 60 may comprise one or more proprietary or public networks, such as the Internet. The communication links 62 can comprise any suitable access communication links, including, but not limited to, digital subscriber line (DSL), DSL communication links, cable modem communication links, fiber communication links, cellular communication links, Wi-Fi communication links, and the like. Data communications can be implemented over any suitable transport mechanism, such as Transmission Control Protocol/Internet Protocol (TCP/IP), User Datagram Protocol/Internet Protocol (UDP/IP), Sequenced Packet Exchange/Internetwork Packet Exchange (SPX/IPX), and the like. As understood by those skilled in the art, each of the communications links 62 may have a maximum bandwidth, quantifiable, for example, in a number of bits per second (bps) that may be transported over the respective communications link 62 at any given time. The bandwidth associated with the communications link 62 may differ depending on the particular type of communications link 62, e.g., cable modem versus a DSL communications link, by sharing requirements of the communications link 62, such as whether a communications link 62 is shared by other devices, and by a number of other factors. Moreover, the bandwidth associated with a communications link 62 may vary arbitrarily over a period of time based on one or more of these and other factors.

Figure 4:
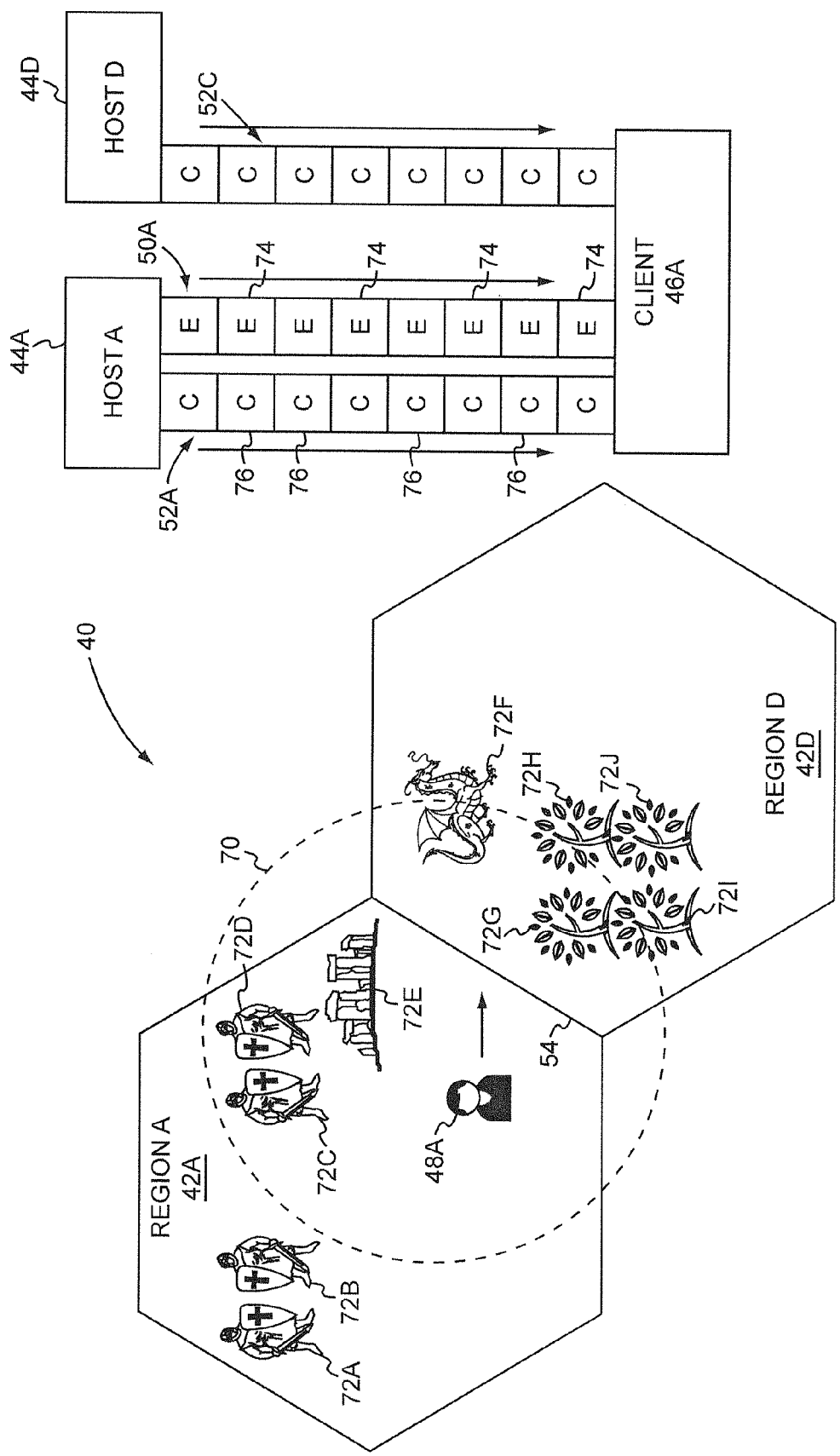
FIG. 4 is a block diagram illustrating a portion of the distributed virtual environment shown in FIG. 2 and exemplary data streams between multiple hosts and a client.

FIG. 4 is a block diagram illustrating a portion of the distributed virtual environment 40 shown in FIG. 2 and exemplary data streams between multiple hosts and a client. For purposes of illustration, only the regions 42A and 42D are illustrated. Assume that the avatar 48A is controlled via the client 46A, which has a connection with the host 44A. An area of interest 70 associated with the avatar 48A identifies an area, or a volume, about the avatar 48A which can be used by one or more hosts 44 to determine which events, and which virtual environment content, should be provided to the client 46A. The area of interest 70 moves in conjunction with the avatar 48A, such that the particular content and events provided to the avatar 48A changes as the avatar 48A roams the distributed virtual environment 40. While the use of an area of interest 70 is described herein as the basis for determining which events to send to the client 46A, the invention is not so limited, and those skilled in the art will appreciate there are a number of techniques that can be used to determine which events to send to the client 46A.

The distributed virtual environment 40 may include a plurality of different types of virtual objects. The avatars 48, which are controlled by users via respective clients 46, may be referred to as user-controlled virtual objects. The host 44 may provide computer-controlled virtual objects that provide certain functionality within the distributed virtual environment 40. Other virtual objects may primarily serve as scenery and make up a part of the landscape of the distributed virtual environment 40. For example, the distributed virtual environment 40 may include knight virtual objects 72A-72D and a dragon virtual object 72F, which are computer-controlled virtual objects that include certain graphical content, but also provide dynamic behavior implemented by one or more hosts 44. The particular behavior of a virtual object might vary depending on the surroundings. The distributed virtual environment 40 may also include virtual objects that primarily serve as scenery, or landscape, for the distributed virtual environment 40, such as a rock virtual object 72E and tree virtual objects 72G-72J. However, it should be understood that any particular virtual object 72 may include a mixture of graphical content and dynamic behavior. For example, the tree virtual objects 72G-72J may sway as storms move through the region 42D.

It may take an abundant amount of data to describe the highly detailed scenery that makes up a landscape of a virtual environment. In a centralized virtual environment that is managed and controlled by a single entity, the landscape of the virtual environment is typically provided to the clients in an installation process prior to actual participation in the virtual environment. During the installation process, the scenery can be loaded onto a respective storage device coupled to the respective processing device. The installation process may take a relatively long period of time due to the amount of graphical information that makes up the landscape, or scenery, of the virtual environment.

In order to render the virtual environment to a user during participation in the virtual environment, the client obtains the graphical information from the local storage device over a relatively high-speed communications path. The primary information that the client receives from the host during participation in the virtual environment is the event stream that carries event data identifying activity occurring in the virtual environment. Since event data provides primarily positional information and state changes associated with virtual objects in a virtual environment, the event stream bandwidth may be less than the bandwidth of the communications link that couples the respective client to the respective host providing the event stream.

In a distributed virtual environment, such as the distributed virtual environment 40, however, where the hosts 44 may be controlled by separate entities, the scenery, or landscape, associated with the distributed virtual environment 40 is provided to the client 46 real-time as the respective avatar 48 roams the distributed virtual environment 40. Unfortunately, the amount of graphical imagery that makes up the landscape may be significant, and may utilize a significant portion, or all of, the bandwidth associated with the communications link 62 with which the client 46 is coupled to the hosts 44. For example, as the avatar 48A moves toward the border 54 separating the region 42A from the region 42D, the host 44A may be sending the client 46A an event stream 50A that includes a plurality of event data segments 74 that identify activity occurring in the region 42A. The event data segments 74 may include, for example, data identifying movements associated with a battle between the knight virtual object 72C and the knight virtual object 72D, since such virtual objects are within the area of interest 70 of the avatar 48A. The host 44A may also be simultaneously sending the client 46A a content stream 52A including a plurality of content data segments 76 containing virtual environment content associated with the region 42A. For example, the content data segments 76 may include imagery data associated with the rock virtual object 72E.

Because the area of interest 70 overlaps the region 42D, the host 44D may also be sending the client 46A a content stream 52C including a plurality of content data segments 76 that include imagery data associated with the tree virtual objects 72G-72I. If the bandwidth of the content stream 52A and the bandwidth of the content stream 52C are sufficiently large, the remaining bandwidth of the respective communications link 62 may be insufficient to enable the event stream 50A to be provided to the client 46A at a data rate that avoids excessive message latency of the event data segments 74. Excessive latency of the event data segments 74 will result in the client 46A providing a rendering of the distributed virtual environment 40 to the respective user that includes jerky, non-uniform movements of virtual objects, such as the virtual objects 72C, 72D. Lag is undesirable to a user, and is frequently sufficiently problematic that a user will terminate participation in the distributed virtual environment 40.

Figure 5:
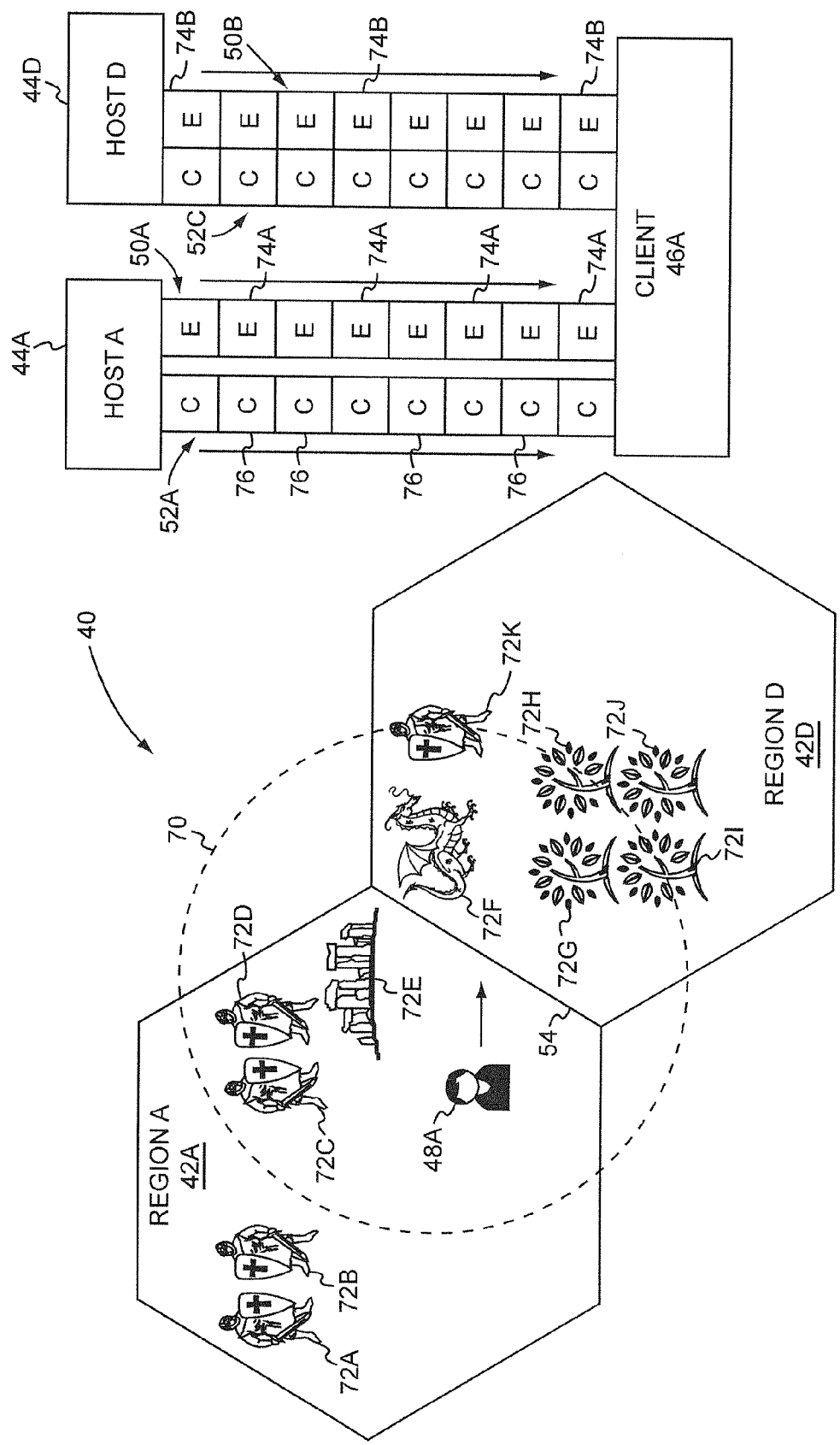
FIG. 5 is a block diagram illustrating the portion of the distributed virtual environment shown in FIG. 4 and exemplary data streams between multiple hosts and a client according to another embodiment.

FIG. 5 is a block diagram illustrating the portion of the distributed virtual environment 40 shown in FIG. 4 and exemplary data streams between multiple hosts 44 and a client 46 according to another embodiment. In FIG. 5, a knight virtual object 72K is battling the dragon virtual object 72F. Thus, the host 44D may begin sending an event stream 50B to the client 46A that includes a plurality of event data segments 74B that identify the activity occurring between the knight virtual object 72K and the dragon virtual object 72F. Notably, the additional bandwidth used by the event stream 50B may further increase latency associated with the event data segments 74A and 74B.

Figure 6:
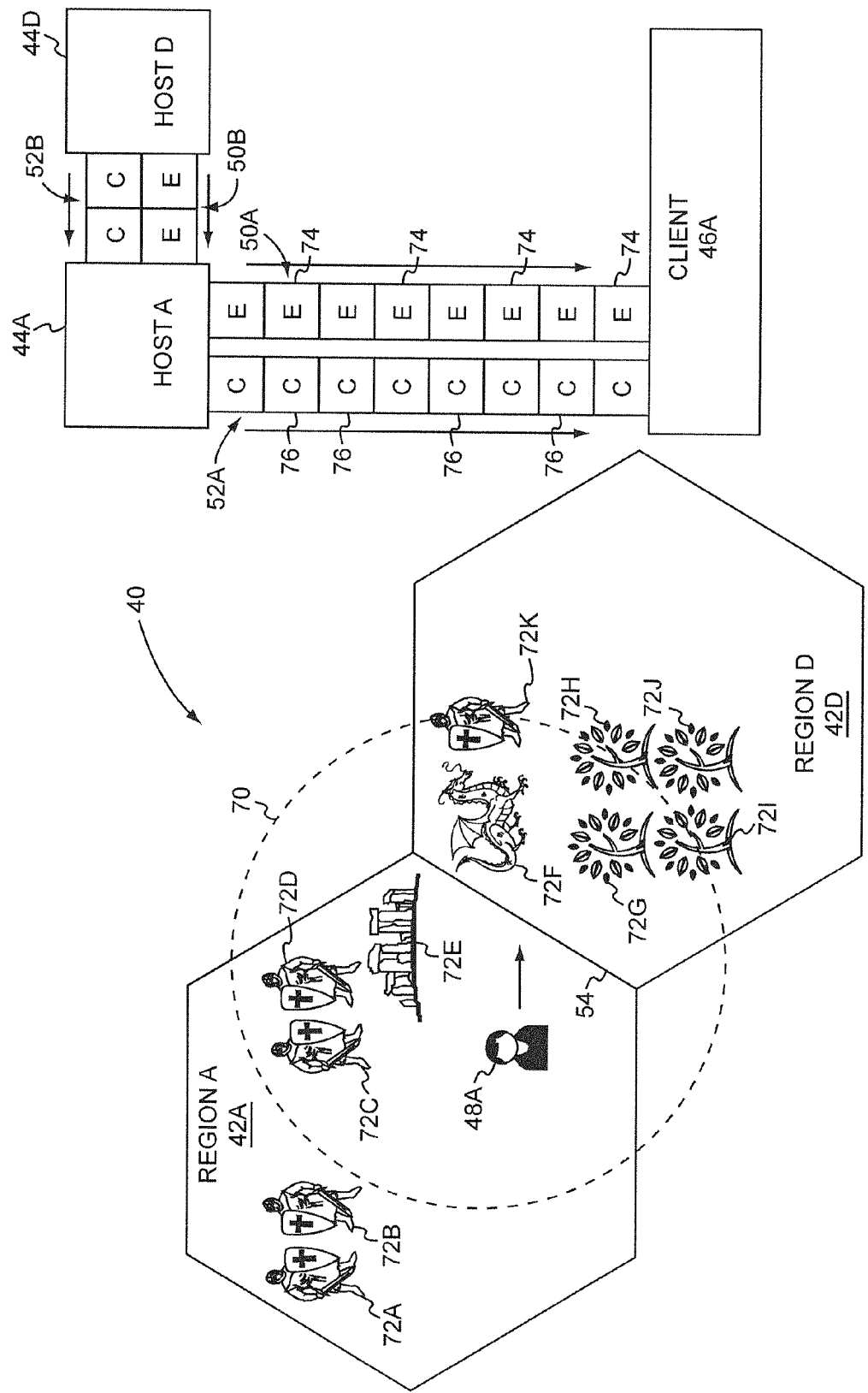
FIG. 6 is a block diagram illustrating the portion of the distributed virtual environment shown in FIG. 4 and exemplary data streams between multiple hosts and a client according to yet another embodiment.

FIG. 6 is a block diagram illustrating the portion of the distributed virtual environment 40 shown in FIG. 4 and exemplary data streams generated by multiple hosts 44 but provided via a single host 44 to a client 46, according to yet another embodiment. As illustrated in FIG. 5, the client 46A is connected to the host 44A. Because the area of interest 70 of the avatar 48A overlaps both regions 42A, 42D, both hosts 44A and 44D are generating content data and event data that will be provided to the client 46A to identify activity and content associated with each respective region 42A, 42D. However, in this embodiment, the client 46A maintains a single connection with the host 44A, and the host 44D provides an event stream 50B and a content stream 52B to the host 44A. The host 44A then provides a single event stream 50A and content stream 52A to the client 46A that includes event data segments 74, and content data segments 76, respectively, from both hosts 44A, 44D. (Note that the area of interest 70 may also overlap other regions 42 but, for purposes of illustration, only the regions 42A and 42D are discussed with respect to FIG. 6.)

Figure 7:
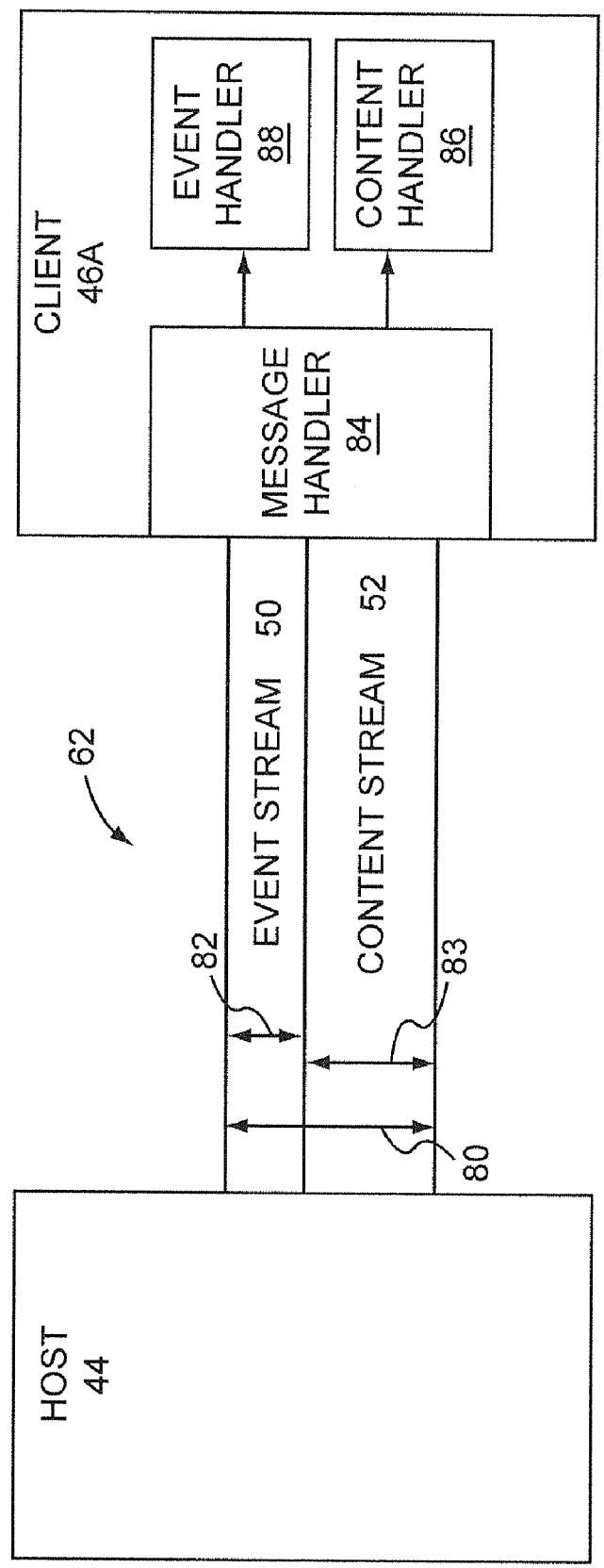
FIG. 7 is a block diagram of a host and a client wherein exemplary data streams are being provided by the host to the client.

FIG. 7 is a block diagram illustrating exemplary data streams being provided by the host 44 to the client 46. The communications link 62 has an associated link bandwidth 80. While bandwidth may be quantified in a number of different ways, for purposes of illustration, the embodiments disclosed herein will quantify a bandwidth in a number of bits per second. For example, the link bandwidth 80 may have a capacity of 1 million bits per second (Mbps). In other words, under ideal conditions the communications link 62 may be able to provide the client 46A 1 Mbps of data. However, as is understood by those skilled in the art, and as discussed previously herein, the link bandwidth 80 may differ based on the type of communication link 62, the time of day, environmental conditions, and the like.

Assume at any given instant the event stream 50 also requires a certain event bandwidth 82 in order to provide data identifying activity occurring in the distributed virtual environment 40 to the client 46A at a rate that prevents lag. Notably, the event bandwidth 82 may vary considerably from instant to instant based on the level of activity occurring within the area of interest 70 of the respective avatar 48 at any instant in time. The client 46A may also be receiving a content stream 52 at a content bandwidth 83 containing virtual environment content including imagery data associated with the distributed virtual environment 40. Thus, the content stream 52 and the event stream 50 compete for a finite amount of link bandwidth 80 associated with the communication link 62.

Note that for purposes of illustration only a single content stream 52 and event stream 50 are shown being provided over the communications link 62. However, depending on the implementation of the distributed virtual environment 40, as discussed below, there may be multiple event streams 50 and multiple content streams 52 being providing to the client 46A simultaneously, all of which are competing for an amount of the finite link bandwidth 80 associated with the communications link 62. As noted previously, the content stream 52 includes content data segments 76, and the event stream 50 includes event data segments 74. A message handler 84 provides the content data segments 76 to a content handler 86, and separates the event data segments 74 and provides the event data segments 74 to an event handler 88.

Figure 8:
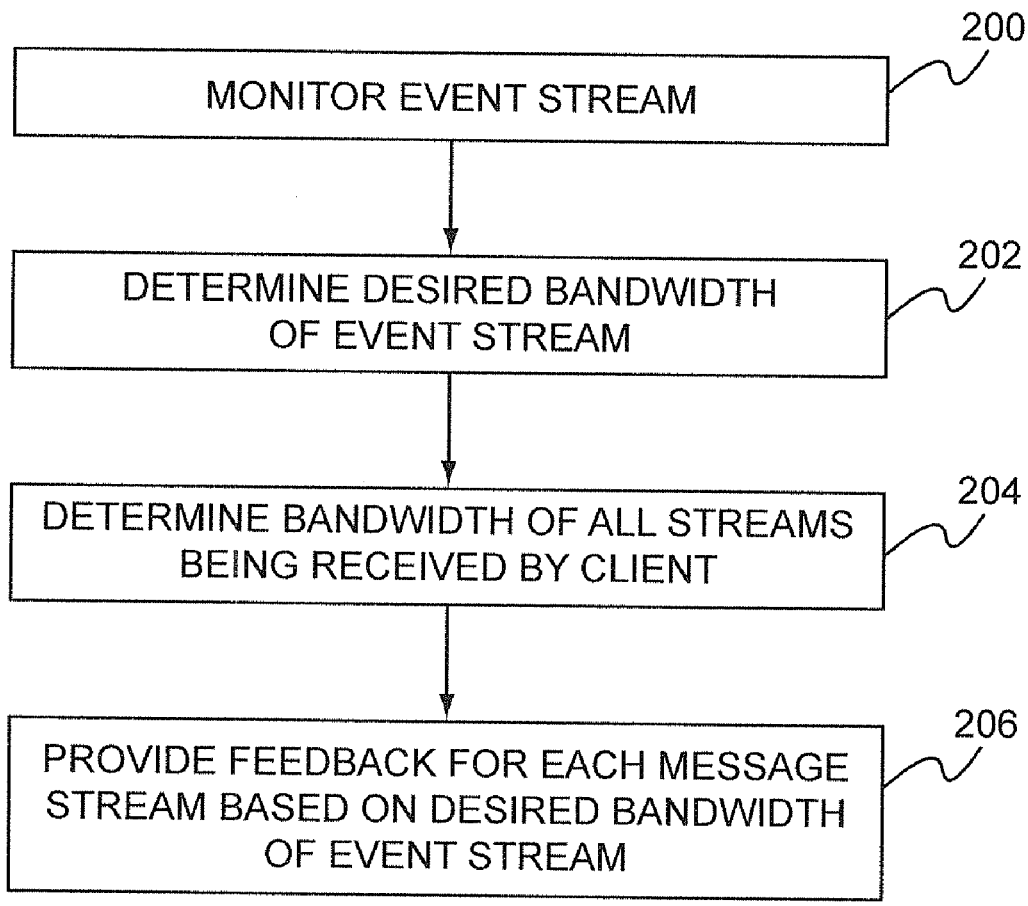
FIG. 8 is a flow diagram of an exemplary process for providing a content stream to a client based on an event bandwidth associated with an event stream.

According to one embodiment, in order to prevent or reduce lag, the content stream 52 is provided at a selected content bandwidth 83 to the client 46A in proportion to, or based on, the event bandwidth 82. The content bandwidth 83 may subsequently be reduced, or increased, as appropriate, based on changes in the event bandwidth 82 or the link bandwidth 80. FIG. 8 is a flow diagram of an exemplary process for enabling the content stream 52 to be provided to the client 46A at a content bandwidth 83 based on the event bandwidth 82. For purposes of illustration, assume that the client 46A is receiving a single event stream 50 and multiple content streams 52. Initially, the client 46A may monitor a performance of the event stream 50 (step 200). The client 46A may monitor the performance of the event stream 50 by collecting feedback from a component in the host 44 providing the event stream 50, such as a virtual world engine that controls the region 42, or a rendering component associated with the client 46A. For example, a flow rate in terms of bytes per second, messages per second, jitter, or other metrics associated with the event stream 50 may be measured and compared to one or more predetermined values that, when exceeded, means a condition, referred to herein as "congestion," exists. Such information could be collected and measured on either or both of the client 46A and the host 44. Congestion may be defined in any desirable manner, and may be defined as meaning lag, or other undesirable conditions, is occurring. If congestion exists, a desired event bandwidth 82 for the event stream 50 that will prevent, eliminate, or reduce lag is determined (step 202). Such determination may be based on any known mechanism for determining suitable bandwidths, such as experimentally determined bandwidths associated with a respective region 42, or a portion of the region 42.

The client 46A determines stream utilization data related to all other streams being received by the client 46A (step 204). In the present example, such streams may include multiple content streams 52 that are being provided by various hosts 44. The stream utilization data may include one or more of message-per-second data for each content stream 52, bytes- or bits-per-second for each content stream 52, jitter statistics associated with each content stream 52, total expected download size of content being provided in a particular content stream 52, time constraints for the content associated with a particular content stream 52, and the like. The client 46A then determines, for each content stream 52, an alteration, such as an increase or reduction, based on the congestion status of the event stream 50, as determined previously, and the stream utilization data. The alteration is provided as feedback to the respective hosts 44 (step 206). The feedback can be based on one or more of the event bandwidth 82, the link bandwidth 80 associated with the respective communications link 62, time constraints associated with data content of the respective content stream 52, and the like. The feedback may also be simply an indication to increase or decrease the bandwidth of the respective content stream 52 based on the event bandwidth 82 by a predetermined amount. Because the client 46A may be continually monitoring each stream performance individually as well as the cumulative effect of all streams, an incremental approach to reducing or increasing the content bandwidth 83 of each of the content streams 52 being received by the client 46A may enable the client 46A to relatively rapidly hone in on a cumulative content bandwidth 83 of all content streams 52 such that the event stream 50 can be provided at a rate that does not result in congestion. Alternately, an adaptive mechanism such as that used by a TCP/IP congestion control algorithm may be used to determine the appropriate feedback. For additional information regarding TCP/IP congestion control algorithms, the interested reader is invited to read M. Allman, V. Paxson, and W. Stevens, "TCP Congestion Control," RFC 2581, Proposed Standard, April 1999.

Figure 9:
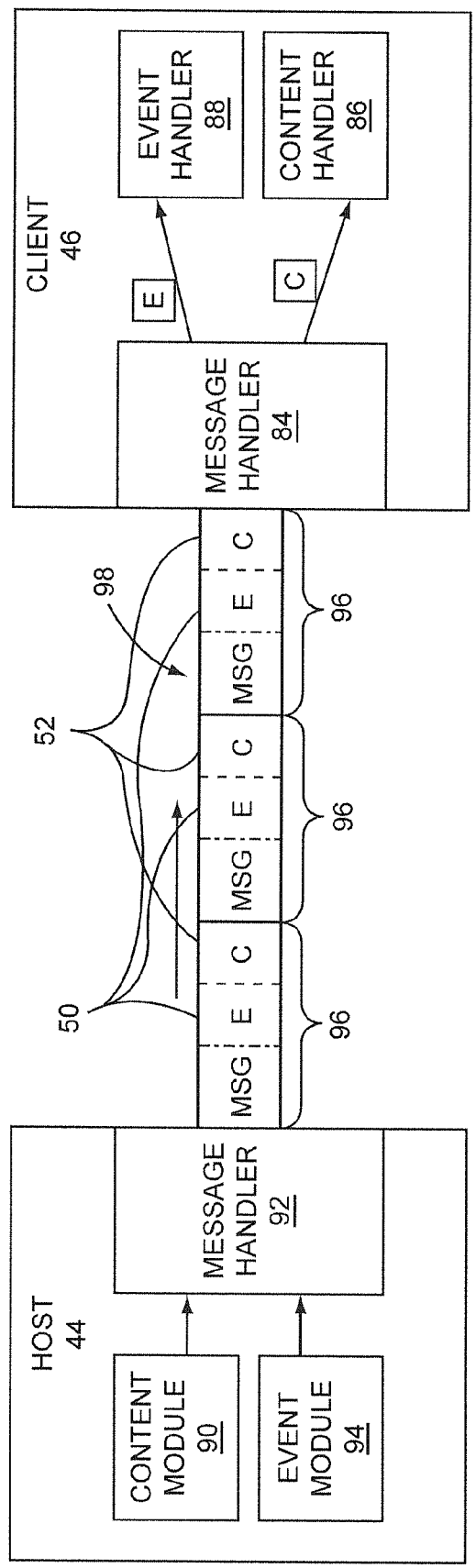
FIG. 9 is a block diagram illustrating a message stream formed by multiplexing an event stream with a content stream.

According to one embodiment, a host 44 may provide a content stream 52 and an event stream 50 to a client 46 over a single connection. For example, in a TCP/IP environment, the single connection may comprise a TCP or UDP socket. Use of a single connection, such as a TCP or UDP socket, reduces the number of connections that a respective processing device must manage. Further, due to the presence of congestion control mechanisms in a TCP/IP stack on both the sending and receiving processing devices, as well as in routers in the network 60, use of a single connection may be significantly less complex than the use of multiple connections. The host 44 may multiplex the event stream 50 with the content stream 52 to form a message stream that includes both content data segments 76 and event data segments 74. FIG. 9 is block diagram illustrating an exemplary message stream formed by multiplexing an event stream 50 with a content stream 52. The host 44 includes a content module 90 that obtains virtual environment content comprising imagery data associated with the distributed virtual environment 40, as discussed previously. The content module 90 provides the virtual environment content to a message handler 92. An event module 94 provides event data identifying activity occurring in the distributed virtual environment 40 to the message handler 92. The message handler 92 receives the content data and event data, and forms messages 96, each of which may include a content data segment 76 and an event data segment 74. The message handler 92 sends the messages 96 in a message stream 98 to the message handler 84 of the client 46. The message handler 84 separates the content data segments 76 from the message stream 98 and provides the content data segments 76 to the content handler 86. Similarly, the message handler 84 separates the event data segments 74 from the message stream 98 and provides the event data segments 74 to the event handler 88. Note that the event data segments 74 in the messages 96 collectively make up the event stream 50, and the content data segments 76 in the messages 96 collectively make up the content stream 52.

Figure 10:
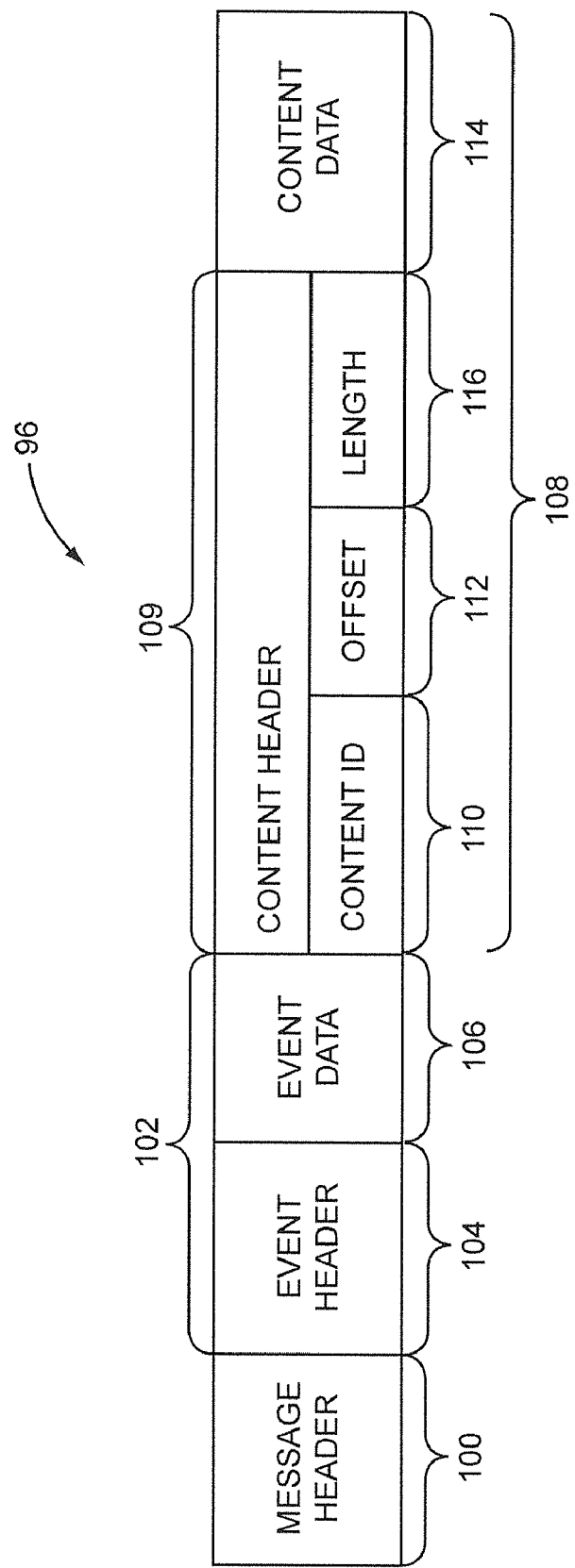
FIG. 10 is a block diagram of a format of an exemplary message in a message stream.

FIG. 10 is a block diagram of a format of an exemplary message 96. The message 96 includes a message header field 100 that may include data identifying a source of the message, a destination of the message, a checksum of the data, a sequence number, and the like. The message 96 also includes an event data segment 102 that includes an event header field 104 containing data, and an event data field 106 containing data identifying a particular activity or state change that occurred in the distributed virtual environment 40. The message 96 further includes a content data segment 108 containing imagery data associated with the distributed virtual environment 40. The content data segment 108 may include a content header field 109 comprising a content identifier (ID) field 110 containing an identifier identifying the particular virtual object being provided to the client 46, an offset field 112 containing data identifying the position of an actual content data field 114 in the content data segment 108 or the message 96, and a length field 116 containing a length of the content data contained in the content data segment 108. Note that the message header field 100 may be a fixed length field, such that the client 46 is aware of precisely where the event data segment 102 is located in the message 96. Further, the event data segment 102 may also be a fixed length, such that the client 46 is aware of precisely where the content data segment 108 is located in the message 96. Alternately, the event data segment 102 could be a variable length, and the event header field 104 would in that case include offset and length fields similar to that provided in the content data segment 108 such that the client 46 could calculate the position of the content data segment 108 in the message 96. Note further that the content data segment 108 is a variable length segment. Consequently, and as described in greater detail below, the host 44 can alter the size of the content data segment 108 as desired to increase or decrease a bandwidth associated with the content stream 52 in proportion to the event stream 50.

Figure 11:
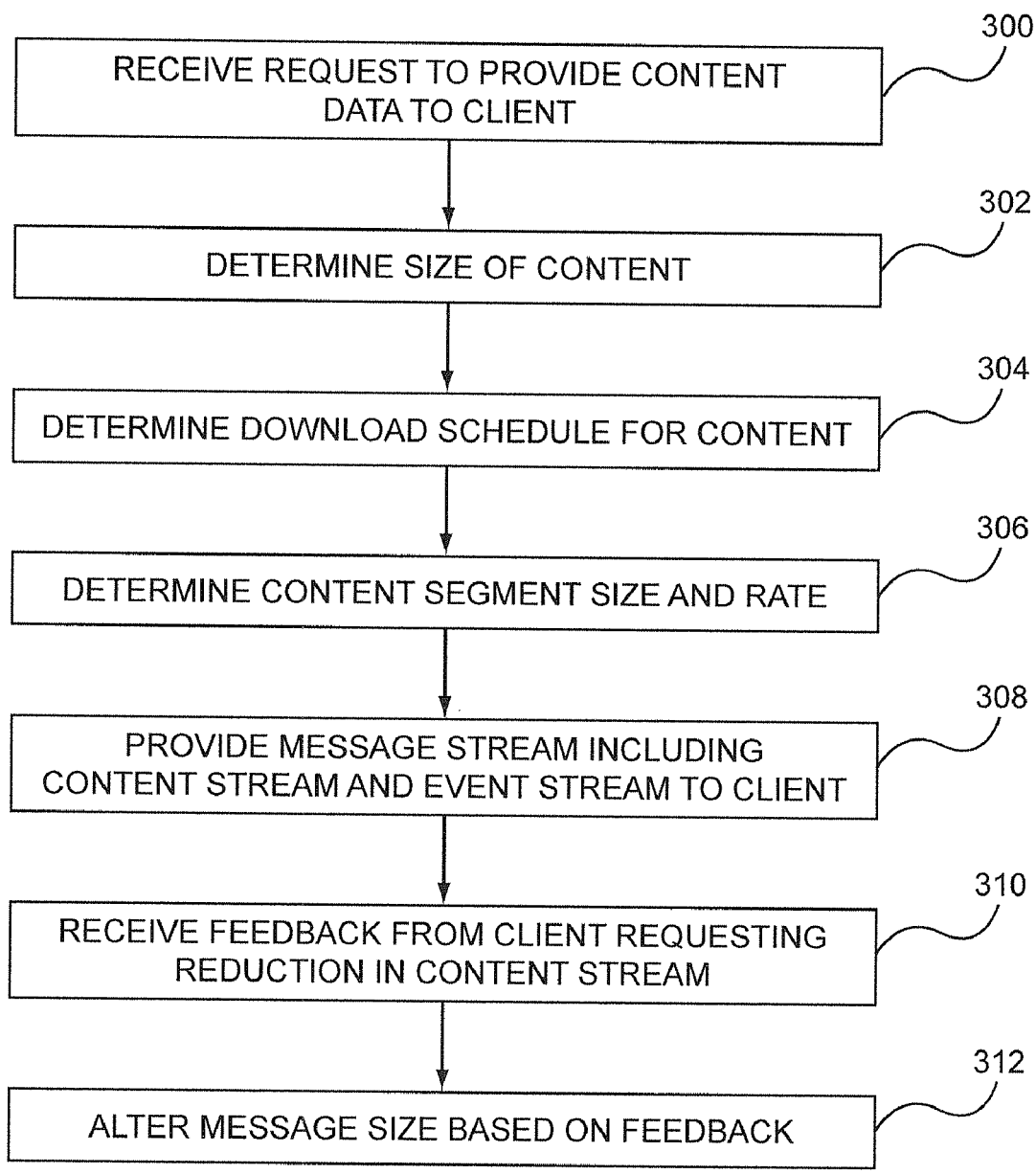
FIG. 11 is a flow diagram of an exemplary process for modifying a content stream in proportion to an event stream based on feedback from a client.

FIG. 11 is a flow diagram of an exemplary process for modifying a content stream 52 in proportion to an event stream 50 based on feedback from a client 46. FIG. 11 assumes the use of a message stream 98, and will be discussed in conjunction with FIGS. 9 and 10. The host 44 (FIG. 9) initially receives a request to provide content data to the client 46 (step 300). The host 44 may determine the overall size of the content, which may include one or more content virtual objects that provide part of the landscape of the distributed virtual environment 40 (step 302). The host 44 may also determine the link bandwidth 80 of the communications link 62 associated with the client 46, if possible (step 304). The host 44 may determine the link bandwidth 80 by requesting the information from the client 46, or the host 44 may have preconfigured information that includes an estimate of the link bandwidth 80 based on information such as the type of communications link 62 and the like. The host 44 may also determine any limits relating to an "upload" transfer rate based on a number of clients 46 that are currently connected to the host 44, the number of other downloads being handled by the respective host 44, priorities of other downloads, and the like. The host 44 then calculates an optimal content transfer schedule, based on the collected information, and determines a size of each content data segment 108, and a frequency of content data segments 108 per event data segments 102 (steps 304-306). The host 44 then begins to multiplex the content data segments 108 with the event data segments 102 into a message stream 98 that is sent to the client 46 (step 308).

The client 46 receives the message stream 98. As discussed previously, the client 46 may continuously monitor all the streams received by the client 46, and determine whether congestion exists. Assume that the client 46 has determined that congestion exists, and provides feedback to the host 44 to reduce the bandwidth of the content stream 52. The host 44 receives the feedback requesting a reduction in the content stream 52 (step 310). The host 44 may reduce the content stream 52 by reducing the size of the content data field 114, or by reducing the proportion of content data segments 108 to event data segments 102, or via a combination of both. If the feedback from the client 46 requests a specific reduction of the content stream 52 in terms of percentage, the host 44 can simply calculate the appropriate ratio of content data segments 108 to event data segments 102, and alter the size of the content data segments 108 as appropriate. Alternately, the client 46 may simply request a reduction which both the host 44 and the client 46 understand to be a predetermined amount less, such as 100 kilobits per second (kbps) less, than is currently being provided to the client 46. Alternately, the host 44 may determine to stop providing the content stream 52 completely for a period of time. In any case, the host 44 begins to alter the messages 96 in accordance with the feedback request (step 312). While the discussion herein has assumed that the client 46 has provided feedback to the host 44 requesting a reduction in the content stream 52, the client 46 may, if sufficient link bandwidth 80 exists, provide feedback requesting an increase in the content stream 52. In such case, the host 44 would similarly determine an appropriate increase in size of each content data segment 108, or increase in the number of content data segments 108 for each event data segment 102.

While for purposes of illustration embodiments of the invention have been described herein in the context of the client 46 providing feedback to the host 44, it will be apparent to those skilled in the art that the feedback used by the host 44 to determine the appropriate ratio of content data segments 108 to event data segments 102 could be generated by the host 44. For example, the host 44 may monitor connections to a single client 46 and alter the ratio of content data segments 108 to event data segments 102, or the host 44 could monitor connections to a plurality of clients 46. In another embodiment, a device separate from the host 44 and the client 46, such as a mediating server or router with deep packet inspection capabilities, could provide such feedback to the host 44.

Figure 12:
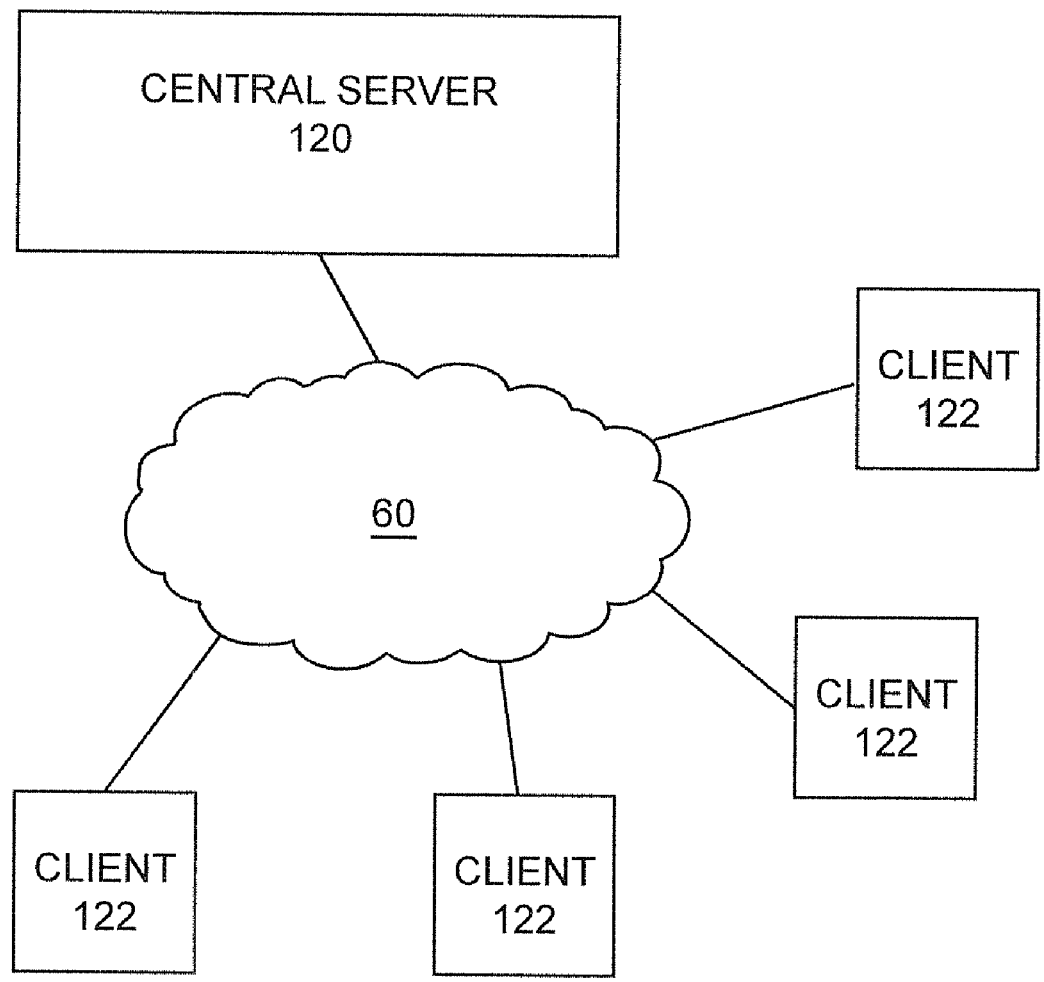
FIG. 12 is a block diagram of an exemplary client-server system.

FIG. 12 illustrates an exemplary embodiment in the context of a conventional client-server based virtual environment. In such a virtual environment, as discussed previously, a single entity or company may control the content of the virtual environment via one or more servers 120, and the imagery associated with the virtual environment may be provided to clients 122 in an installation process prior to participation in the virtual environment. Typically, when the virtual environment is updated by the company, each client 122 is notified of such update, and is required to download the update prior to being permitted to connect to the virtual environment. However, in one embodiment of the present disclosure, such a centralized client-server system may provide a content stream of the virtual environment update to the clients 122 during participation in the virtual environment by multiplexing a content data stream containing the content data with an event data stream that is being provided to the clients 122 during participation. Similar to the embodiments discussed above, the clients 122 may provide feedback to the server 120 regarding the size of the respective content stream with respect to an event stream based on whether or not congestion exists. Such embodiment could eliminate a conventional offline update process that is time-consuming and disruptive to a user of the virtual environment.

The embodiments disclosed herein may be implemented in hardware, firmware, software, or any combination thereof. Embodiments can be implemented as a computer program product, including a computer usable medium having a computer readable program code embodied therein, wherein the computer readable program code is adapted to be executed to implement the functionality described herein. Such a computer usable medium can include any suitable medium for storing computer instructions, such as but not limited to a CD, a DVD, a hard disk drive, random access memory (RAM), or any other memory device suitable for storing computer readable program code.

Those skilled in the art will recognize improvements and modifications to the preferred embodiments of the present invention. All such improvements and modifications are considered within the scope of the concepts disclosed herein and the claims that follow.

What is claimed is:

1. A method for providing content in a virtual environment comprising the following computer-implemented steps:

providing, from a host computer hosting a region in the virtual environment to a client computer participating in the virtual environment, an event stream comprising a plurality of event data segments identifying activity occurring in the virtual environment;

providing virtual environment content comprising imagery data depicting landscape features of the virtual environment to the client computer, wherein the virtual environment content is provided to the client computer in a content stream comprising a plurality of content data segments containing the virtual environment content at a content stream bandwidth; and altering the content stream bandwidth of the content stream to increase the content stream bandwidth or decrease the content stream bandwidth based on a determination regarding the event stream, wherein the content stream bandwidth is altered by altering a proportion of a number of content data segments to a number of event data segments in a plurality of messages being provided to the client computer.

2. The method of claim 1 wherein the plurality of event data segments identify activity occurring in the region in the virtual environment that is hosted by the host computer.

3. The method of claim 1 wherein the virtual environment comprises a distributed virtual environment comprising a plurality of regions, including the region, and wherein a plurality of host computers, including the host computer, each hosts a different one of the plurality of regions.

4. The method of claim 1 wherein the plurality of event data segments identify activity occurring in the region in the virtual environment that is hosted by the host computer and activity occurring in a second region that is hosted by a second host computer.

5. The method of claim 1 wherein the event stream and the content stream comprise a plurality of messages, each message comprising at least one content data segment and at least one event data segment.

6. The method of claim 1 further comprising establishing a connection between the host computer and the client computer, and wherein the event stream and the content stream are provided over the connection.

7. The method of claim 6 wherein the connection comprises a first port identifier associated with the host computer and a second port identifier associated with the client computer.

8. The method of claim 1 wherein the altering the content stream bandwidth of the content stream to increase the content stream bandwidth or decrease the content stream bandwidth based on the determination regarding the event stream comprises:

measuring, by the host computer, a metric associated with the event stream;

making a determination that the metric differs from a predetermined metric; and based on the determination that the metric differs from a predetermined metric, altering the content stream bandwidth of the content stream to increase the content stream bandwidth or decrease the content stream bandwidth.

9. The method of claim 8 wherein the metric comprises one of a number of bytes per second, a number of messages per second, and jitter.

10. The method of claim 1 wherein altering the content stream bandwidth comprises altering a frequency of content data segments to event data segments being provided to the client computer.

11. An apparatus for providing a region in a virtual environment comprising:
 a network interface adapted to communicate with a network; and
 a controller adapted to:
  provide to a client computer via the network interface an event stream comprising a plurality of event data segments identifying activity occurring in the virtual environment;
  provide virtual environment content containing imagery data depicting landscape features of the virtual environment to the client computer, wherein the virtual environment content is provided to the client computer via the network interface in a content stream comprising a plurality of content data segments containing portions of the virtual environment content at a content stream bandwidth based on an event stream bandwidth associated with the event stream; and
  alter the content stream bandwidth of the content stream to increase the content stream bandwidth or decrease the content stream bandwidth based on a determination regarding the event stream, wherein the content stream bandwidth is altered by altering a proportion of a number of content data segments to a number of event data segments in a plurality of messages being provided to the client computer.

12. The apparatus of claim 11 wherein the event stream and the content stream comprise a plurality of messages, each message comprising at least one content data segment and at least one event data segment.

13. The apparatus of claim 11, wherein to alter the content stream bandwidth of the content stream to increase the content stream bandwidth or decrease the content stream bandwidth based on the determination regarding the event stream, the controller is further adapted to:
 measure a metric associated with the event stream;
 make a determination that the metric differs from a predetermined metric; and
 based on the determination that the metric differs from a predetermined metric, alter the content stream bandwidth of the content stream to increase the content stream bandwidth or decrease the content stream bandwidth.

14. The apparatus of claim 13 wherein the metric comprises one of a number of bytes per second, a number of messages per second, and jitter.

15. A computer program product, comprising a non-transitory computer usable medium having a computer readable program code embodied therein, the computer readable program code adapted to be executed to implement steps for providing content in a virtual environment comprising:
 providing, from a host computer hosting a region in the virtual environment to a client computer participating in the virtual environment, an event stream comprising a plurality of event data segments identifying activity occurring in the virtual environment;
 providing virtual environment content comprising imagery data depicting landscape features of the virtual environment to the client computer, wherein the virtual environment content is provided to the client computer in a content stream comprising a plurality of content data segments containing the virtual environment content at a content stream bandwidth; and
 altering the content stream bandwidth of the content stream to increase the content stream bandwidth or decrease the content stream bandwidth based on a determination regarding the event stream, wherein the content stream bandwidth is altered by altering a proportion of a number of content data segments to a number of event data segments in a plurality of messages being provided to the client computer.

16. The computer program product of claim 15, wherein to alter the content stream bandwidth of the content stream to increase the content stream bandwidth or decrease the content stream bandwidth based on the determination regarding the event stream, the computer readable program code is adapted to be executed to implement steps:
 measuring a metric associated with the event stream;
 making a determination that the metric differs from a predetermined metric; and
 based on the determination that the metric differs from a predetermined metric, altering the content stream bandwidth of the content stream to increase the content stream bandwidth or decrease the content stream bandwidth.

17. The computer program product of claim 16, wherein the metric comprises one of a number of bytes per second, a number of messages per second, and jitter.

* * * * *